Aug. 28, 1962  J. R. CRESSEY ETAL  3,051,933
ELECTRICALLY OPERATED APPARATUS FOR REMOTE MEASURING
Filed May 4, 1959
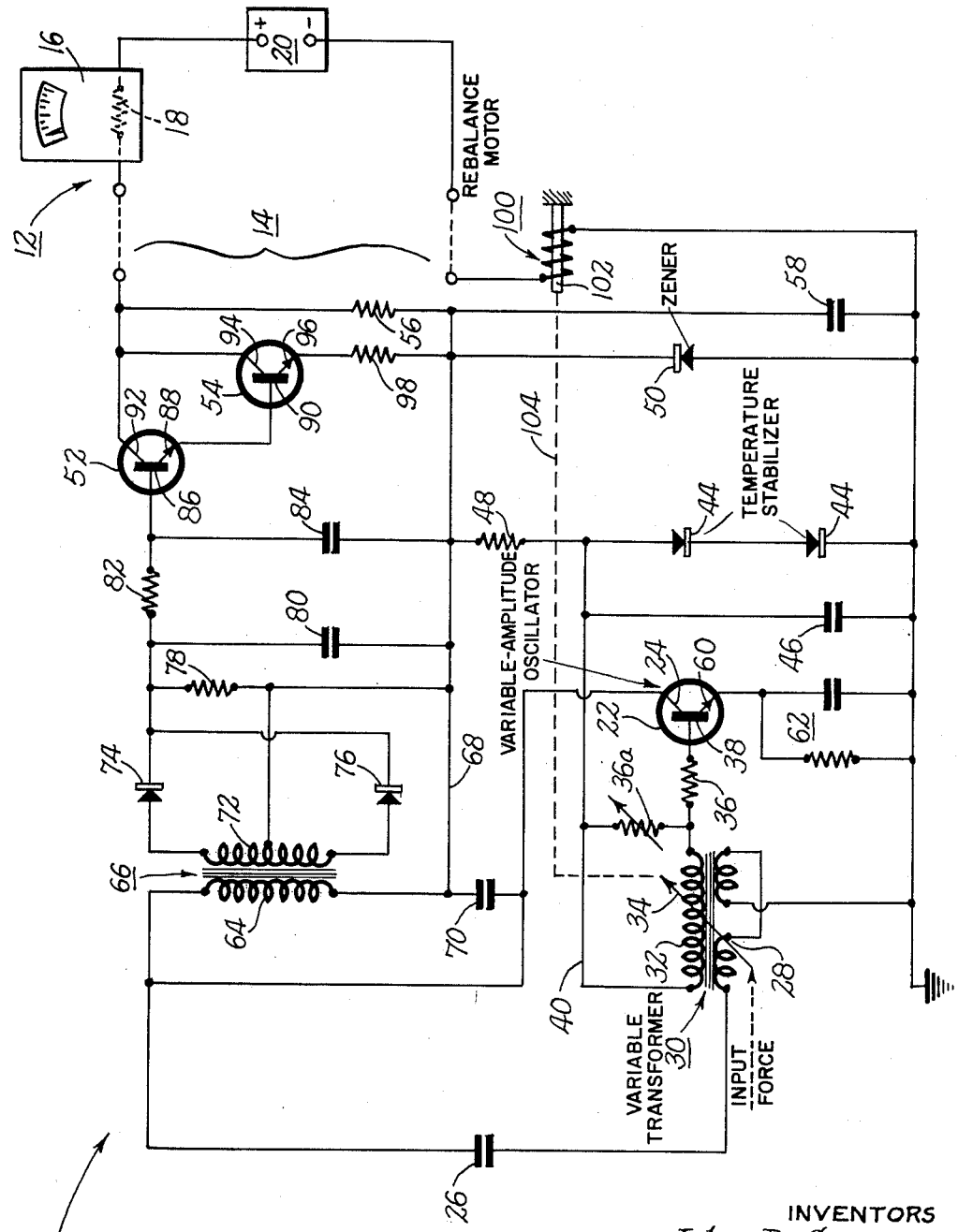
INVENTORS
John R. Cressey
Neal D. Peterson
Alfred Nazareth, Jr.
Richard P. Lawler
BY
Curtis, Morris + Safford
ATTORNEYS

United States Patent Office

3,051,933
Patented Aug. 28, 1962

3,051,933
ELECTRICALLY OPERATED APPARATUS FOR REMOTE MEASURING
John R. Cressey, Dedham, Neal D. Peterson, North Easton, Alfred Nazareth, Jr., Rehoboth, and Richard P. Lawler, Foxboro, Mass., assignors to The Foxboro Company, Foxboro, Mass.
Filed May 4, 1959, Ser. No. 810,808
11 Claims. (Cl. 340—187)

This invention relates to an improved arrangement for sending from a remote location to a central station an electrical signal proportional to a physical condition, such as pressure, temperature, or the like, being measured at the remote location.

An object of this invention is to provide a simple and efficient apparatus for converting the measurement of a physical condition into a corresponding electrical signal and for then transmitting this signal to a distant point where it can be used to operate a device such as an indicator or process controller.

Another object is to provide such apparatus which is relatively inexpensive and which is accurate, stable, and reliable in operation.

A more specific object is to provide remote measuring and signalling apparatus of this kind which can operate for long periods of time without maintenance or service and which requires only a single pair of wires over which the current drawn from power supplied at a central signal receiving station is the measurement signal transmitted from a distant point to the central station.

Other objects, aspects and advantages of the invention will in part be apparent from and in part pointed out in the description given hereinafter.

In certain industrial applications where physical conditions such as temperature, rate of flow, etc., are measured and controlled it frequently is necessary to have the condition-sensing device positioned a considerable distance, perhaps as much as several miles, from an instrument or meter at a central station where the measurement can conveniently be indicated or recorded. For many years it has been the practice to produce at such a remote location an air pressure signal the value of which was directly proportional to the magnitude of the condition. This pressure signal was then transmitted via an air line to a pneumatically-operated recording instrument or the like at the central station.

Recently, partly because of the need for equipment capable of quicker response and also because of certain inherent limitations of pneumatic systems, electrically-operated apparatus has at times been used in place of the prior pneumatic devices. In such electrical systems, a transmission line normally is used to connect the remote measuring device with a centrally-located meter. However, a problem with many of these electrical systems is that the most practical electrical transducers (i.e. devices used to convert the measurement of a physical condition into an electric signal) are able to produce only very small current or voltage outputs. Thus it generally is necessary at the remote location to amplify the signal to a level high enough for transmission to a distant central station. Where vacuum tubes having heated filaments are used to amplify the signal at the remote station (as shown for example in U.S. Patent Re. 24,267), the connecting line to the central station not only requires a pair of wires for transmitting the measurement signal, but also requires one or more wires for supplying electrical power to the vacuum tubes.

Transistors, of course, do not require a separate source of filament power, and therefore it obviously is advantageous to substitute them for vacuum tubes in these remote measuring systems in order to reduce the number of interconnecting wires. However, the power handling capacity of presently available transistors is relatively low and they are very sensitive to changes in temperature. Accordingly, their use in remote measuring circuits requiring a high degree of accuracy and reliability has been very limited. The present invention provides a practical solution to these problems.

In a specific embodiment of the invention to be described hereinbelow, there is provided a three-transistor signalling circuit which is arranged to sense a physical condition, namely, the amount of force exerted on a movable transducer element, and to produce a direct-current output signal the magnitude of which is linearly proportional to this force. This circuit is adapted to be connected to a transmission line of substantial length without causing instability or variation in the signal current. The far end of the line normally will terminate at a central station having an indicating or recording meter in series with a source of D.-C. current which is the sole power supply for the entire system. The signal current flowing in the line also drives a torque motor physically included as part of the signalling circuit. This motor operates to apply a rebalancing force to the movable transducer element, which may for example be an iron vane in a magnetic field, so that the transducer element moves only a minute distance throughout the entire range of force measurement. Thus the output current of the circuit is substantially linearly related to the input force without errors due to changes in position of the transducer element.

The first of the three transistors in this signalling circuit is arranged as a controllable-amplitude oscillator, the amount of positive feedback being varied in accordance with the force exerted on the movable transducer element. The alternating output of this oscillator thus corresponds to the applied force, and this output is rectified and fed as a D.-C. signal to a two-stage transistor amplifier which controls the current in the transmission line leading the central station. This amplifier has a substantial D.-C. gain (about 150) yet is capable of operation without "hunting" even though the mechanical resonant frequency of the rebalancing torque motor is relatively low, e.g. 60 c.p.s. In the specific embodiment described herein, this freedom from hunting is achieved by means of a D.-C. signal-delaying circuit connected between the oscillator and the D.-C. amplifier. Electrical stability also is enhanced by a voltage-regulating circuit arranged to maintain the oscillator bias and energizing potentials constant throughout the operating range of the instrument, and by filtering means arranged to assure that no harmful pulses of current are applied to the amplifying transistors.

A better understanding of the invention together with a fuller appreciation of its advantages will best be gained from the following description considered together with the accompanying drawing which shows a circuit arrangement embodying the invention.

Referring now to the drawing, the measuring system consists of a signalling circuit indicated at 10 and a metering and recording circuit indicated at 12. The signalling circuit 10 can be far removed (for example, several miles) from the metering and recording circuit, these two circuits being connected together by a two-wire line 14.

The metering circuit 12 includes a meter 16 which may, for example, be a chart recorder of known construction, having its internal impedance represented by a resistor 18. Connected to this meter is a D.-C. source 20 which supplies the current flowing serially through the meter, line 14 and signalling circuit 10. The magnitude of this current is controlled by the signalling circuit, as will be explained, to produce an indication at meter 16 proportional to the physical condition (force) being measured.

The D.-C. source 20, via line 14, supplies the only power required for operation of the signalling circuit.

As shown in the lower left-hand corner of the drawing, the signalling circuit 10 includes a first transistor 22 arranged to function as a variable-amplitude oscillator. For this purpose, the collector electrode 24 of the transistor is connected to a positive feedback circuit including a capacitor 26 and the primary windings 28 of a variable transformer 30. This transformer may be of known construction arranged to provide variable coupling between its primary and secondary windings 32 in accordance with the positioning of a movable element schematically illustrated by the arrow 34. Details of a transformer suitable for this purpose are set forth in copending patent application Serial No. 760,946, filed by E. Olsen and H. Bowditch on September 15, 1958, now U.S. Patent 2,956,-212, issued October 11, 1960.

One end of the secondary windings 32 is connected through a small resistor 36 (150 ohms) to the base 38 of the transistor 22. A variable resistor 36a connected across the secondary windings 32 of the variable transformer 30 provides a range adjustment for the signalling circuit 10 by providing for the adjustment of the gain of transistor 22. Bias potential is supplied to the base electrode 38 through a connection from the other end of the secondary windings and a lead 40 to a D.-C. voltage-regulating circuit generally indicated at 42. This circuit includes a pair of temperature-compensating diodes 44 in parallel with a capacitor 46, and in series with a voltage-dropping resistor 48 (22,000 ohms). The potential across the dropping resistor and diodes is held constant by a voltage-regulating Zener diode 50 the lower terminal of which is grounded. The Zener diode is supplied with current from line 14 through parallel paths including two other transistors 52, 54 and a resistor 56, and a capacitor 58 is bridged across the Zener diode to prevent the A.-C. signal from the oscillator from adversely affecting the operation of the Zener diode 50 and the circuit connected thereto.

The emitter electrode 60 of transistor 22 is grounded through the usual resistor-capacitor circuit 62, and the collector electrode 24 is supplied with current from the voltage-regulating circuit 42 by means of a connection through the primary winding 64 of a transformer 66 and a lead 68 which extends to the upper terminal of the Zener diode. Thus the Zener diode voltage-regulating circuit serves to stabilize the collector potential as well as the bias potential of the transistor 22.

With this arrangement, the amplitude of oscillations produced by transistor 22 is determined by the amount of coupling provided between the primary and secondary windings of transformer 30, and this coupling in turn is controlled by the positioning of the movable element 34. Although the alternating output of the oscillator varies in amplitude over a relatively wide range, the average current through transistor 22 remains essentially constant. The temperature-compensating diodes 44 serve in the usual way to counteract the effects of changes in the base resistance of transistor 22 resulting from changes in ambient temperature, and thereby assure that the biasing current remains constant within the ordinary range of ambient temperatures.

The alternating output of the transistor, typically an audio-frequency signal, appears across the transformer primary winding 64 which is provided with a shunt capacitor 70. The secondary winding 72 of this transformer is center-tapped and is conected to a full-wave rectifier including diodes 74, 76 to produce a D.-C. voltage across a resistor 78 (2200 ohms), the lower end of which is connected to lead 68. This D.-C. voltage is smoothed by a filter including a shunt capacitor 80 (1 mf.) in combination with a signal-delaying circuit having a series resistor 82 (10,000 ohms) and a shunt capacitor 84 (100 mf.).

The delayed D.-C. signal is applied to the base electrode 86 of transistor 52, the emitter electrode 88 of which is connected directly to the base electrode 90 of the next transistor 54. The collector electrodes 92, 94 of these two transistors are connected together to the upper wire of line 14, and the emitter electrode 96 of transistor 54 is connected through a small resistor 98 (10 ohms) to the Zener diode 50. With this arrangement, the potential of the emitter 88 tends to follow the potential of base 86, and therefore the effective input impedance of transistor 52 is made relatively high (e.g. of the order of 25,000 ohms). Thus this transistor does not substantially affect the operation of the D.-C. signal-delaying circuit 82, 84.

Reviewing the operation of the signalling circuit 10, when a change in the input force alters the position of transducer element 34, there results a corresponding change in the amplitude of the A.-C. oscillations produced by transistor 22. This A.-C. signal is fed through transformer 66 and is rectified to develop a corresponding D.-C. signal which is filtered and delayed by circuit elements 80, 82, 84. This delayed D.-C. signal then is fed to the first stage amplifier 52 which in turn feeds a corresponding D.-C. signal to the power output stage 54. This latter stage, which is connected in series with line 14, thereby produces a relatively large change in the D.-C. current flowing through line 14 and meter 16.

Connected in series with the lower wire of line 14 is a rebalancing torque motor 100 controlled by the signal current. This motor may be of any conventional construction, but preferably is a motor of the type shown in the above-mentioned copending application. The armature 102 of this motor is mechanically interconnected, as indicated by dotted line 104, with the movable element 34 of the transformer 30. When the signal current flowing in line 14 varies due to a change in the force acting on transformer element 34, motor 100 acts in a direction to oppose this force change and to rebalance element 34. This rebalancing type of operation is important in making the signal current linearly proportional to the force being measured.

By connecting the Zener diode regulating circuit 42 in series with the output transistor 54, the voltage drop across this transistor will be relatively low (about 1 volt), and hence the power dissipation in the transistor will be small so that it can be operated for long periods of time without failure. This Zener diode circuit 42 supplies a fixed potential both for biasing the oscillator transistor 22 and also for energizing the collector electrode of this transistor, and this enhances stable electrical operation throughout the full range of the instrument. The electrical stability of the instrument also is improved by operating transistor 22 as a controllable-amplitude oscillator, and by coupling the A.-C. output of the oscillator to a rectifier circuit to produce a D.-C. signal which is filtered prior to being fed to the D.-C. amplifier transistors 52 and 54. By these means, any sharp pulses which might appear in the oscillator output are prevented from reaching the amplifier transistors so that these transistors can be operated within their rated capacity. This feature further assures that the instrument can be used for long periods of time without breakdown.

One of the special problems encountered with force-balance instruments is "hunting," i.e. wherein the output signal continually fluctuates while the input force remains constant. Such hunting can occur particularly when the "loop gain" around the rebalancing feedback circuit is greater than unity at the mechanical resonant frequency of the rebalancing motor. This problem is particularly severe in devices of the general type disclosed herein, since the torque motor normally will have a relatively low resonant frequency (e.g. 60 c.p.s.), yet the D.-C. gain of the amplifier must be very high so as to assure that a signal of adequate intensity is transmitted along line 14 to the central station.

This problem has been solved in accordance with one aspect of the present invention by converting the A.-C.

oscillator signal to a corresponding D.-C. signal, and then feeding this D.-C. signal to signal-delaying circuit 82, 84 before applying this signal to the amplifier transistors 52, 54. This signal-delaying circuit is arranged to reduce the overall "loop gain" of the instrument to below unity at a frequency of 60 c.p.s., yet provides an amplifier gain of about 150 at all frequencies up to 0.16 c.p.s., with a gradual fall-off in gain above the latter frequency. Consequently, the instrument produces output signals of substantial magnitude (within a current range of 10–50 ma.) for very small changes in input force, yet it operates stably without difficulty due to hunting. Moreover, due to the relatively high input impedance of the transistor amplifier 52, 54, this result may be achieved by a simple signal-delaying circuit constructed of readily-available and inexpensive parts. That is, because of the high input impedance, the series resistor 82 can be relatively large without causing any substantial loss in signal level, and consequently a relatively small shunt capacitor 84 can be used to obtain the required delay time in the signal-delaying circuit.

Although a preferred embodiment of the invention has been set forth in detail, it is desired to emphasize that this is not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

We claim:

1. For use in electrical data transmission systems and the like, a remote transmitter adapted to send a D.-C. line signal over a two-wire transmission line to a central station which includes a D.-C. power supply connected to said transmission line for energizing said transmitter; said transmitter comprising: a variable-amplitude transistor oscillator having a positive feedback circuit between the output and the input of the transistor, said feedback circuit including coupling means having a movable element operable to vary the magnitude of the positive feedback signal so as to control the A.-C. output amplitude of said oscillator in accordance with the positioning of said movable element, rectifier means connected to said oscillator to produce a D.-C. control signal corresponding in magnitude to said A.-C. output amplitude, a transistor amplifier connected to said rectifier means and operable by said D.-C. control signal, and output circuit means connecting said transistor oscillator and said transistor amplifier in series with said two-wire transmission line to provide energizing current thereto from said D.-C. power supply, the flow of current through said transmission line being controlled by said transistor amplifier in accordance with the magnitude of said D.-C. control signal.

2. For use in electrical data transmission systems and the like, a remote transmitter adapted to send a D.-C. line signal over a two-wire transmission line to a central station which includes a D.-C. power supply connected to said transmission line for energizing said transmitter; said transmitter comprising: a controllable-amplitude transistor oscillator, a movable element coupled to said oscillator to vary the A.-C. output amplitude thereof in accordance with the positioning of said movable element, a rectifier connected to said oscillator to produce a D.-C. control signal corresponding in magnitude to said A.-C. output, a D.-C. transistor amplifier coupled to the output of said rectifier and controlled by said D.-C. control signal, a low-pass filter circuit coupled to the output of said rectifier to prevent damage to said transistor amplifier from sharp pulses, and an output circuit connecting said transistor amplifier and said transistor oscillator in series with said two-wire transmission line to provide energizing current thereto from said D.-C. power supply, the flow of current through said transmission line being controlled by said transistor amplifier in accordance with the magnitude of said D.-C. control signal.

3. For use in an electrical data transmission system and the like, a signalling circuit adapted to send a signal over a two-wire transmission line to a central station which includes a D.-C. power supply for energizing said signalling circuit; said signalling circuit comprising a transistor oscillator circuit, a movable element coupled to said oscillator to control the output thereof in accordance with the positioning of said movable element, a transistor amplifier coupled to the output of said transistor oscillator for producing an amplified signal corresponding to said output of said oscillator circuit, an output circuit for said transistor amplifier for feeding said amplified signal to said two-wire transmission line, and a voltage-regulating circuit in series with said transistor amplifier and said transmission line, said voltage-regulating circuit being connected to said transistor oscillator to furnish stabilized energizing current thereto.

4. Apparatus as claimed in claim 3, wherein said voltage-regulating circuit comprises a Zener diode.

5. In a system for remotely measuring the value of a physical condition such as pressure and the like, and wherein the measurement signal is fed over a two-wire transmission line to a central station having a D.-C. source serially connected to said transmission line and to a signal-responsive device, and wherein a signalling circuit is connected to the remote end of said two-wire transmission line for controlling the D.-C. current flowing therein in accordance with the value of said physical condition; that improvement in said signalling circuit which comprises a transistor oscillator, a transducer forming part of said oscillator and having a movable element for varying the output amplitude of said oscillator in accordance with the value of the physical condition being measured, circuit means coupled to the output of said oscillator for producing a D.-C. signal corresponding in magnitude to the oscillator output amplitude, a transistor amplifier coupled to said circuit means and arranged to produce a D.-C. output signal corresponding to the amplitude of oscillations, and means conductively connecting said transistor oscillator and said transistor amplifier in series with each other and with said two-wire transmission line, at least a portion of the D.-C. signal current flowing through said transistor amplifier providing the energizing current for said transistor oscillator.

6. A system as claimed in claim 5, including a voltage-regulating circuit connected in series with said transistor amplifier and said two-wire transmission line, and means connected between said voltage-regulating circuit and at least one of the electrodes of said transistor oscillator to furnish regulated potential thereto for stabilizing the oscillations of said oscillator.

7. A system as claimed in claim 5, including a transformer having a primary winding coupled to the output of said transistor oscillator, a rectifier circuit connected to the secondary winding of said transformer to produce a D.-C signal corresponding in magnitude to the amplitude of oscillations, and means for feeding said D.-C. signal to the input of said transistor amplifier.

8. In a system for remotely measuring the value of a physical condition such as pressure, and wherein a D.-C. measurement signal is fed over a two-wire transmission line to a central station having a D.-C. source serially connected with said transmission line and a signal-responsive device, and wherein a signalling circuit is connected to the remote end of said two-wire transmission line to control the D.-C. current flowing therein in accordance with the value of said physical condition; that improvement in said signalling circuit which comprises: a first transistor conductively connected to said transmission line to receive operating current therefrom, a positive feedback circuit connected to said first transistor to form a controllable oscillator, a transducer in said positive feedback circuit for controlling the output amplitude of said oscillator in accordance with the value of the physical condition being measured, circuit means producing a D.-C. signal responsive to the output amplitude of said oscillator, a signal-delaying circuit connected to the output of said circuit means, a second transistor having an output circuit conductively connected in series with said transmission line and having an input terminal connected to the output of said signal-delaying circuit, whereby a change in the output of said oscillator produces a corresponding but delayed change in current flowing through said transmission line, and a rebalancing motor connected in series with said transmission line to apply to said transducer a rebalancing force corresponding in magnitude to the current flowing in said transmission line.

9. Apparatus as claimed in claim 8, wherein said output circuit of said second transistor is connected to the emitter electrode thereof, said output circuit including circuit means responsive to changes in signal applied to said second transistor input terminal to vary the potential on said emitter electrode, the emitter electrode potential tending to follow the signal applied to said input terminal, whereby the input impedance of said second transistor is made relatively high.

10. Apparatus as claimed in claim 9, wherein said second transistor output circuit includes a third transistor having its collector and emitter electrodes conductively connected in series with said transmission line, the base electrode of said third transistor being connected to the emitter electrode of said second transistor.

11. In a system for remotely measuring the value of a physical condition such as pressure, and wherein a D.-C. measurement signal is fed over a two-wire transmission line to a central station having a D.-C. source serially connected with said transmission line and a signal-responsive device, said D.-C. source supplying all of the electrical energy for the measuring system, and wherein a signalling circuit is connected to the remote end of said two-wire transmission line to control the D.-C. current flowing therein in accordance with the value of said physical condition; that improvement in said signalling circuit which comprises: a first transistor conductively connected to said transmission line to receive operating current therefrom, a positive feedback circuit connected to said first transistor to form a controllable oscillator, a transducer in said positive feedback circuit and having a movable element for controlling the A.-C. output of amplitude of said oscillator in accordance with the value of the physical condition being measured, rectifier means coupled to said oscillator and producing a D.-C. signal responsive to the A.-C. output of said oscillator, a signal-delaying circuit including a series resistor and a shunt capacitor connected to the output of said rectifier means; a second transistor having its base electrode connected to said signal-delaying circuit to receive the delayed D.-C. signal therefrom, the collector electrode being connected to said transmission line to supply energizing current to said second transistor; a third transistor having its base electrode connected to the emitter electrode of said second transistor, a Zener diode voltage-regulating circuit connected in series with said transmission line and the emitter and collector electrodes of said third transistor, circuit means connecting the stabilized voltage of said regulating circuit to said oscillator circuit to fix the bias and collector potentials thereof, and a rebalancing motor connected in series with said transmission line, said motor having an armature mechanically interconnected with the movable element of said transducer to apply thereto a rebalancing force corresponding in magnitude to the current flowing in said transmission line.

References Cited in the file of this patent
UNITED STATES PATENTS

| | | |
|---|---|---|
| 2,517,960 | Barney | Aug. 8, 1950 |
| 2,663,806 | Darlington | Dec. 22, 1953 |
| 2,714,702 | Shockley | Aug. 2, 1956 |
| 2,932,817 | Kershaw | Apr. 12, 1960 |
| 2,974,303 | Dixon | Mar. 7, 1961 |

FOREIGN PATENTS

| | | |
|---|---|---|
| 757,060 | Great Britain | Sept. 12, 1956 |

OTHER REFERENCES

Trott: "An Electronic Device for Measuring Small Transient Displacements," Journal of Scientific Instruments, Vol. 29, No. 7, July 1952, pages 212, 213.